United States Patent [19]

Postle et al.

[11] Patent Number: 4,643,588
[45] Date of Patent: Feb. 17, 1987

[54] METHOD OF MONITORING TEMPERATURE

[75] Inventors: Stephen R. Postle, Wilmslow; Roy P. Barber, Sale, both of England

[73] Assignee: Ciba-Geigy AG, Basel, Switzerland

[21] Appl. No.: 718,914

[22] Filed: Apr. 2, 1985

[30] Foreign Application Priority Data

Apr. 25, 1984 [GB] United Kingdom ............... 8410548

[51] Int. Cl.$^4$ ....................... G01K 11/06; G01D 21/00
[52] U.S. Cl. ..................... 374/160; 116/206; 374/162; 422/55; 422/57; 422/61; 436/2; 436/164; 426/88
[58] Field of Search ............ 116/206, 207, 201; 374/159–162; 252/408.1, 961, 962; 422/55, 57, 61; 436/2, 7, 164–166; 426/88

[56] References Cited

U.S. PATENT DOCUMENTS

| | | |
|---|---|---|
| 3,465,590 | 9/1969 | Kluth et al. ........................ 374/162 |
| 3,520,124 | 7/1970 | Myers ................................. 116/206 |
| 3,774,450 | 11/1973 | Godsey ............................. 116/207 |
| 3,888,631 | 6/1975 | Stürzinger ......................... 116/207 |
| 3,946,611 | 3/1976 | Larsson ............................. 374/106 |
| 4,003,245 | 1/1977 | Ogata et al. ....................... 116/201 |
| 4,120,818 | 10/1978 | Swindells et al. ................. 116/207 |

FOREIGN PATENT DOCUMENTS

| | | | |
|---|---|---|---|
| 83032 | 7/1971 | Fed. Rep. of Germany ...... | 374/162 |
| 2135630 | 2/1973 | Fed. Rep. of Germany ...... | 374/161 |
| 275467 | 3/1971 | U.S.S.R. ............................ | 116/207 |

Primary Examiner—Charles Frankfort
Assistant Examiner—W. Morris Worth
Attorney, Agent, or Firm—Wenderoth, Lind & Ponack

[57] ABSTRACT

A method of monitoring if a stored product has exceeded a predetermined temperature using an assembly, which comprises coated onto a carrier a gelatin layer containing an acidic reactant, color former and an encapsulated non-aqueous solvent.

18 Claims, No Drawings

METHOD OF MONITORING TEMPERATURE

This invention relates to a method of monitoring if a stored product has exceeded a predetermined temperature.

Many goods are stored for long periods at temperatures at which no deterioration of the goods will occur. However it is most important to any rise in temperature above a predetermined temperature at which deterioration of the goods can occur is monitored. It is necessary that an irreversible indication is given of any such rise in temperature and a maximum-minimum thermometer could be used for this purpose. However such thermometers are expensive and furthermore it is desirable that a rise-in-temperature indicator be affixed to all the individual packages of goods in a storage system in case local changes of temperature have occured. A number of inexpensive devices have been suggested which can be affixed to packages to monitor irreversibly a rise in temperature. A number of these devices are capsules rather than labels and monitor specifically when the temperature rises above the melting point of water ice. Thus it was proposed that the act of thawing releases moisture associated with the frozen goods and this moisture causes either a colour change or exposes a warning sign. In another proposed method a mark or sign present in or as a frozen liquid changes in apearance when a thaw occurs. In yet another device the act of freezing expands the water therein and breaks a capsule, this is only observed when the temperature rises above the freezing point of water. In some other proposals an irreversible colour change occurs at the predetermined temperature when at least one of the compounds is a free flowing liquid which is rendered mobile at the predetermined temperature. However this can be messy unless in a capsule and often the colour change is not very pronounced.

A very observable colour change is that wherein a colourless electron donating colour former reacts with an electron accepting acidic material to form a colour in the presence of a solvent for the colour former. Such a reaction is used in the well-known carbonless copying system in which paper is coated with capsules which contain a solution of colour former, there being coated in proximity to the capsules either on the same sheet of paper or on a sheet of paper in physical contact therewith an acidic electron accepting compound. When the sheet containing the capsules is written on the capsules burst and in these regions a colour is formed.

In another system involving the use of a colour former and coreactant there is coated on the paper a solic colour former and a solid co-reactant. The co-reactant melts when heated and when molten is able to react with the colour former to produce a colour change. This reaction is employed in a thermographic paper system, for example a paper roll attached to a cash till wherein a heated key bearing an alpha-numeric symbol comes into contact with the thermographic paper to yield on the paper a coloured replica of the symbol.

In British Patent Specification No. 1405701 a particular reversible thermochromic mixture is described which comprises an electron-donating colour former, an acidic electron acceptor and an alcohol, ester, ketone or ether. Such a mixture may be encapsulated and used for various purposes, for example packaging and decorative effects, as well as rather crude temperature indicating devices. The thermochromic material described in this application could not however be used to monitor reliably if a stored product had exceeded a predetermined temperature because the colour change is reversible. We have found a method of using material comprising a colour former and a co-reactant to monitor reliably if a stored product has exceeded a predetermined temperature.

According to the present invention there is provided a method of monitoring if a stored product has exceeded a predetermined temperature which comprises using as a colourable composition a colour former and an acidic reactant there being present a non-aqueous solvent, in which colour formation can take place in the molten state but not in the solid state and which melts at the said predetermined temperature, optionally there being present other components of the colourable composition, which method comprises encapsulating the solvent and optionally at least one other component of the colourable composition as long a such components and the solvent are not capable of producing a colour, applying to a carrier the capsules of encapsulated solvent and the remaining components of the colourable composition, acclimatising the carrier to the storage temperature of the product, then, when it is in close proximity with the stored product breaking the capsules of encapsulated solvent and observing when a substantially irreversible colour change occurs which indicates that the stored product has exceeded the said predetermined temperature.

When the capsules are broken the solvent cannot mix with the other components of the colourable composition as it is solid. However when or if the temperature rises the solvent melts and as it is no longer encapsulated it is able to mix with the other components which partially dissolve at least in the solvent and are able to react to form a dye.

The carrier onto which the colourable composition is applied may be a label composed of paper or film material or be a plastics material ticket or similar device.

The carrier may be a small piece of paper which after application of the colourable composition is attached to larger label or sticker which bears written instructions or other printed matter. However, in one embodiment the carrier is the stored product itself and the colourable composition is coated thereon as an ink. The colourable composition as an ink may be jet or spray coated on the product or it may be coated onto the product through a stencil or silk screen or printed by contact means. The label may comprise two separate colourable compositions which change colour at different temperatures. For example, one may change colour at $-3°$ C. and the other at $0°$ C.

it is to be understood that the term non-aqueous solvent means either a single non-aqueous compound which can act as a solvent for the colour former or a eutectic mixture of non-aqueous compounds which has a sharply defined melting point, the mixture being capable of acting as a solvent for the colour former.

However it is to be understood that the solvent may act also as either the colour former or as the acidic reactant in which case the colourable composition wwill comprise only two main components. In the first case the colour former/solvent will melt so as to react with the reactant to form a coloured dye. In the second case the reactant/solvent will melt and be able to dissolve the colour former to allow the colour formation to take place.

Thus for example the colourable composition may consist of:

(a) Colour former and solvent in capsules plus reactant applied separately to carrier.

(b) Reactant and solvent in capsules plus colour former applied separately to carrier.

(c) Solvent alone in capsule plus colour former and reactant optionally in admixture applied to the carrier.

(d) Solvent alone in capsule plus colour former and reactant in separate layers on the carrier.

(e) Solvent which is also an acidic reactant in capsules plus colour former applied separately to carrier.

(f) Solvent which is a colour former in capsules plus acidic reactant applied separately to carrier.

Preferably the colour former is dissolved in the liquid solvent and then the solution is encapsulated.

Preferably the capsules containing the solvent and the colour former are dispersed with a solid acidic reactant and the dispersion coated on a carrier together with a binder. A suitable binder is gelatin, for example.

The colourable composition may be coated in layers on the carrier, for example the reactant may be coated as one layer and on this layer may be coated the capsules which contain the solvent and colour former. It is to be understood that the remaining components of the colourable composition, that is to say the components not present with the solvent in the capsules, may also be encapsulated, but there is no advantage to this.

Many classes of both organic and inorganic compounds are suitable for use as the acid reactant. Suitable classes of organic compounds are phenolic compounds such as bisphenol A, 4-hydroxydiphenylsulphone, p-hydroxy benzoic acid esters and polyphenols, phenolic resins such as novolac resins, metallised phenolic compounds or resins such as zinc salicylate, dicarboxylic acids and chloral reaction products.

Suitable classes of inorganic compounds are Lewis acids such as zinc chloride, activated acidic clays and silica gel.

By activated clay is meant a naturally occurring clay mineral which has been treated with a strong acid or a concentrated salt solution so that all ion exchangeable sites are homo-ionic. Thus an activated clay has a higher Bronsted and Lewis acidity than a naturally occurring clay.

Suitable colour formers are any of the color formers used either in pressure sensitive carbonless copying systems or in thermographic systems which include a colour former.

Particularly suitable classes of colour formers are phthalides, fluorans, leucoauramines, spirodipyranes, chromenoindoles, chromenopyrazoles, phenoxazines, phenothiazines, quinazolines, carbazolylmethanes, triarylmethanes, rhodamine lactams and azomethines.

Particularly useful phthalide colour formers are those of formula

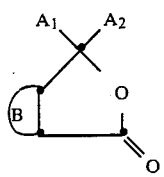

herein $A_1$ and $A_2$ may be the same or different and each represents an amino substituted phenyl radical of the formula

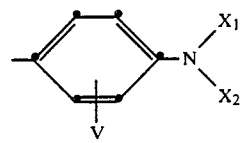

or an indolyl radical of the formula

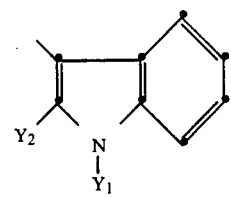

and the ring B represents a benzene, naphthalene, pyridine or pyrazine ring, wherein the benzene ring of B is unsubstituted or substituted by nitro, 1 to 4 halogen atoms such as chlorine or bromine or the group $-NX_3X_4$, in which formulae $X_1$, $X_2$, $X_3$ and $X_4$ each independently of the other are hydrogen, alkyl which contains not more than 12 carbon atoms and is unsubstituted or substituted by halogen, hydroxy, cyano or lower alkoxy, or are $C_5-C_6$-cycloalkyl, unsubstituted or substituted aryl or aralkyl, or each pair of substituents ($X_1$ and $X_2$) and ($X_3$ and $X_4$) independently of one another, together with the nitrogen atoms to which said pair is attached, form a 5- or 6-membered heterocyclic radical V represents hydrogen, halogen, $C_1-C_5$-alkyl, $C_1-C_5$-alkoxy, $C_1-C_5$ acyloxy or di-$C_1-C_5$ alkyl-amino, $Y_1$ is hydrogen, alkyl of not more than 12 carbon atoms which is unsubstituted or substituted by halogen, hydroxy, cyano or lower alkoxy, or is acyl of 1 to 12 carbon atoms or benzyl which is unsubstituted or substituted by halogen, $C_1-C_5$-alkyl or $C_1-C_5$-alkoxy enol, and $Y_2$ is hydrogen, $C_1-C_5$-alkyl or phenyl.

Specific compounds of formula (1) are 3,3-bis-(4-dimethylaminophenyl)-6-dimethyl-amino-phthalide(-crystal violet lactone) (blue), 3,3-bis-(N-ethyl-2'-methyl-indolyl-3'-)-phthalide (red), 3,3-bis-(N-octyl-2'-methyl-indol-3'-yl)-phthalide (red), 3,3-bis-(N-octyl-2'-methyl-indol-3'-yl)-4,5,6,7-tetrachlorophthalide (violet), 3-(4'-diethylamino-2'-ethoxy-phenyl)-3-(N-ethyl-2''methyl-indol-3''-yl)4-azaphthalide (blue), 3-(4'-diethylamino-2'ethoxy-phenyl)-3-(N-octyl-2''methyl-indol-3''-yl)-4-azaphthalide (blue), 3,3-bis-(4'-dimethylamino-phenyl)-phthalide (malachite green lactone) (green) and 3,3-bis-(2',4'-bis-(dimethylamino)-phenyl)phthalide (blue).

The colour of the protonated colour former is indicated after its name.

Particularly useful fluoran colour formers are those of formula

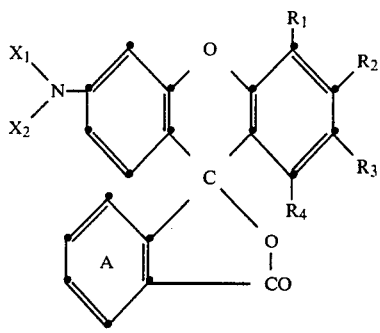 (2)

wherein
$R_1$, $R_2$ and $R_4$, independently of each other are hydrogen, halogen or $C_1$-$C_5$-alkyl, $R_3$ is hydrogen, halogen, $C_1$-$C_5$-alkyl or —$NX_3X_4$, $X_1$, $X_2$, $X_3$ and $X_4$, independently of each other are hydrogen, alkyl which contains not more than 12 carbon atoms and is unsubstituted or substituted by halogen, hydroxy, cyano or lower alkoxy or are $C_5$-$C_6$-cycloalkyl, unsubstituted or substituted aryl or aralkyl, or each pair of substituents ($X_1$ and $X_2$) and ($X_3$ and $X_4$) independently of one another, together with the nitrogen atom to which said pair is attached, forms a 5- or 6-membered heterocyclic radical, and A is unsubstituted or substituted by nitro or 1 to 4 halogen atoms.

Specific compounds of formula (2) are 2-chloro-3-methyl-6-diethylamino-fluoran (red), 2-dibenzylamino-6-diethylamino fluoran (green), 2-n-octylamino-6-diethylamino fluoran, 2-butylamino-6-diethylamino fluoran (green), 2-tert butyl-6-diethylamino-fluoran (orange), 3-methyl-6-diethylamino fluoran (orange), 1,3-dimethyl-6-diethylamino-fluoran (orange), 2-anilino-3-methyl-6-diethylamino-fluoran (black), 2-(2'-chloroanilino)-6-diethylamino-fluoran (black), 2-(2' chloroanilino)-6-di-n-butylamino fluoran (black), 2-dibenzylamino-6-pyrrolodino-fluoran (green), 2-anilino-3-methyl-6-piperidinofluoran (black), 2-anilino-3-methyl-6-N-methyl-N-cyclohexylaminofluoran (black) an 2-anilino-3-methyl-6-N-tolyl-N-ethylamino fluoran (black).

The colour of the protonated colour former is shown after the name of the compound.

Particularly suitable carbazolylmethanes or triarylmethanes are compounds of the formula

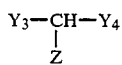 (3)

wherein
$Y_3$ and $Y_4$ may be the same of different and each represents an amino-substituted phenyl radical of the formula

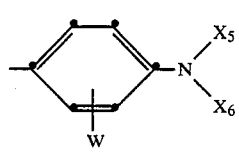

or an indolyl radical of the formula

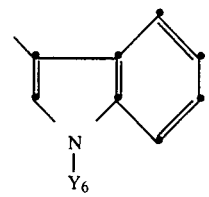

and Z represents optionally substituted aryl or a heterocyclic radical having a substituent $R_6$ on the heterocyclic atom, $X_5$ and $X_6$, each independently of the other, are hydrogen, alkyl which contains not more than 12 carbon atoms and is unsubstituted or substituted by halogen, hydroxy, cyano or lower alkoxy, or are cycloalkyl, unsubstituted or substituted aryl or aralkyl, or $X_5$ $_{l\ and\ X_6}$ together with the nitrogen atom to which they are attached are a 5- or 6-membered heterocyclic radical, W represents hydrogen, halogen, $C_1$-$C_5$-alkoxy, or $C_1$-$C_5$-acyloxy or di-($C_1$-$C_5$-alkyl)-amino, $R_6$, $Y_6$ each independently of the other are hydrogen, alkyl of not more than 12 carbon atoms which is unsubstituted or substituted by halogen, hydroxy, cyano or lowwer alkoxy, or is acyl of 1 to 12 carbon atoms or benzyl which is unsubstituted or substituted by halogen, $C_1$-$C_5$-alkyl or $C_1$-$C_5$-alkoxy and $Y_5$ is hydrogen, $C_1$-$C_5$-alkyl or phenyl.

Examples of heterocyclic radical Z are 3-carbazolyl, 2-furenyl, 3-indolyl, 2or 4-pyridyl and 2 or 4-thienyl.

Specific compounds of formula (3) are bis-(4-dimethylaminophenyl)-phenyl-methane (green), tris-(4-dimethylamino phenyl)-methane (blue), bis-(4-dimethylaminophenyl)-3-N-ethyl carbazolyl methane (blue), bis-(N-ethyl-2-methyl-indol-3-yl)-phenyl methane (red), bis-(4-dimethylaminophenyl)-tolyl methane (green), tris-(N-methyl-N-phenyl amino phenyl) methane (blue), bis-(N-methyl-N-phenylamino phenyl) N-butyl-carbazol-3'-yl methane (blue) and bis-(4-dimethylamino phenyl)-furylmethane (blue).

The colour of the protonated colour former is shown after its name.

Particularly suitable phenoxazine or phenothiazine colour formers are those of formula

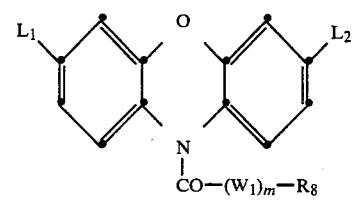 (4)

where
Q is oxygen or sulphur,
$L_1$ represents hydroxy or —N $X_{11}$ $X_{12}$,
$L_2$ represents hydrogen, hydroxy or —N $X_{13}$ $X_{14}$,
$W_1$ is oxygen or NH,
$R_8$ represents alkyl, aryl or aralkyl and m is 1 or 2,
$X_{11}$, $X_{12}$, $X_{13}$ and $X_{14}$, each independently of the other are hydrogen, alkyl, aryl or aralkyl or each pair of substituents ($X_{11}$ and $_{12}$) and ($X_{13}$ and $X_{14}$) independently of one another, together with the nitrogen atom to which said pair is attached, forms a 5- or 6-membered heterocyclic radical, A particularly suitable colour former of formula (4) is benzoyl leuco methylene blue which has the formula

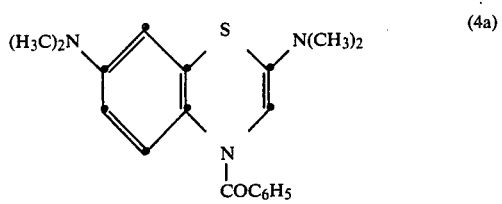

Protonation of this compound forms a leuco dye which is oxidized by atmospheric oxygen to a blue dye.

Particularly suitable rhodamine lactam colour formers are those of formula

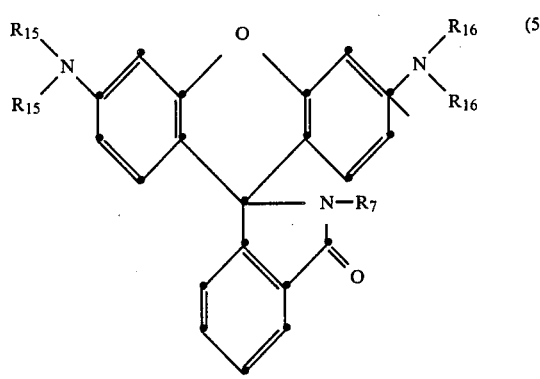

where $R_{15}$ and $R_{16}$ are each alkyl groups having from 1 to 4 carbon atoms and $R_{17}$ is an aryl group.

A large number of non-aqueous solvents are of use in the present invention for example fatty acid esters, such as benzyl laurate, butyl stearate, dicarboxylic acid esters, such as diethylsuccinate, dimethyl phthalate, fatty acids (also as co-reactants) such as lauric acid, myristic acid, aromatic hydrocarbons, such as toluene, xylene, benzyltoluene, naphthalene, alkyl naphthalene, diphenyl alkanes, halogenated aromatics such as bromonaphthalene, and acylated aromatic compounds such as acetonaphthalene.

Certain esters and fatty acids make very useful non-aqueous solvents. Exemplary of such compounds are listed in the following TABLE 1.

TABLE 1

| Compound | m.p. (°C.) |
| --- | --- |
| diethyl succinate | −20 |
| diethyl phthalate | −3 |
| 1-bromonaphthalene | −1 |
| dimethyl phthalate | +2 |
| dimethyl adipate | +8.0 |
| benzyl laurate | +8.5 |
| decyldecanoate | +9.7 |
| acetonaphthalene | +12 |
| butyl stearate | +12.2 |
| ethyl myristate | +12.3 |
| dimethyl succinate | +18–19 |
| benzyl myristate | +20.5 |
| benzyl palmitate | +27.2 |
| lauric acid | +43 |
| myristic acid | +54 |
| palmitic acid | +61–62.5 |

The last three listed solvents being acids can also act as the acidic reactant component of the colourable composition.

Some stored products and the temperatures at which spoilation starts to occur are shown in TABLE 2, where T is the start of spoilation temperature in °C.

TABLE 2

| T (°C.) | Stored Products |
| --- | --- |
| −5 | frozen foods |
| +4 | whole blood |
| +8 | vaccines and insulin |
| +30 | steroid creams |

Thus as the storage temperature of many products is below ambient temperature the method of the present invention in which the solvent is kept in capsules during the preparation of colourable composition on the carrier enables the colour formation reaction between the colour former and the reactant using a solvent which is liquid at ambient temperature to be utilised to monitor the storage of products with spoil at ambient temperature.

Encapsulated to the solvent can be performed by any of the usual encapsulation technique for example interfacial polymerisation, in situ polymerisation, in-liquid curing coating, coacervation from an organic solvent solution system, melt-dispersing an cooling, in-gas suspending coating or spray drying.

The preferred size of the resultant capsules of use in the present invention is from 2 to 20 μm.

Preferably the capsules and the remaining components of the colourable composition are dispersed in a binder and coated on a carrier. A suitable binder is gelatin. Other useful binders are nitrocellulose, cellulose acetate and polyvinyl pyrolidinone.

Ohter optional components which may be present in the colourable composition include zinc stearate to intensify the colour produced by the colour former reacting with the acidic reactant and starch granules to provide physical protection for the capsules until it is required to break them.

In another embodiment a quick acting colour former dissolved in a solvent which remains liquid at the storage temperature of the product to be monitored is present in the colourable composition in other capsules. When the composition has been armed by breaking the capsules a colour change occurs at once as the dissolved colour former is able to react at once with the acidic reactant. This colour reaction shows that the colourable composition has been 'armed' and is now able to monitor the storage condition of the product. In this embodiment most preferably a different colour is produced to that produced when the product is being monitored has exceeded the requisite storage temperature. Also, it is important that the solvent which is liquid at the storage temperature should not be a solvent for the colour former which couples in the monitoring reaction unless the two types of capsules are in separate areas of the label or product.

The colourable composition when applied to the carrier can be 'armed' after acclimatisation by physically breaking the capsule by hand or by use of a rough surface such as sand paper. Alternatively a stylus or (semi) automatic punching device may be employed. In this latter way, a hidden code may be imprinted.

The microcapsules used in the Examples were prepared as follows:

A 5% aqueous gelatin solution (deionised blend: 80 g) was heated at 70° C. and the appropriate solvent or solution to be encapsulated (30 g) was added and stirred vigorously to form fine droplets. To this mixture was added slowly with stirring, a 5% aqueous gum acacia solution (Hopkins and Williams blend; (80 g). The pH of the whole was adjusted to 4.0, and stirring continued for 3 to 4 hours at 50° C. Water (200 g) was then added, together with 40% aqueous formaldehyde solution (1 g). The whole was cooled to 10° C. and the pH adjusted to 9.0.

The microcapsules produced had a median size in the range 5-10 μm. The use of gelatin and gum acacia as the wall material is not intended to limit the techniques and materials by/from which microcapsules suitable for use in this invention can be manufactured.

The following Examples will serve to illustrate the invention.

In all the following Examples microcapsules were used which had a mean diameter 5 of 10 μm.

EXAMPLE 1

In this Example a layer which comprised an acidic reactant was first coated on a white paper carrier. After this layer had dried a layer which comprised encapsulated solvent and a colour former was coated thereon. The details of the preparation are as follows:

(a) Silica gel (2.0 g) and an ionic wetting agent (0.5 g), which is a sulphonated, polyethoxylated long chain alcohol, were added to 10% aqueous gelatin (deionised blend: 25 g), and the whole made up to 50 g by the addition of water and vigorous stirring. This mixture was coated at 3 m/min onto a subbed polythene laminate base, at a coating wight of 80 mg/dm².

(b) Crystal violet lactone (1 g) was dispersed in a 10% aqueous gelatin solution (25 g) containing the wetting agent used in (a) (0.4 g) by dissolving the lactone in chloroform (4 ml) and precipitating it on addition to the aqueous phase at 40° to 50° C. To the dispersion was added a microcapsule dispersion containing 1-bromonaphthalene (2 g; 38% solids), and the whole made up to 50 g with water. This mixture was coated on top of mixture (a) at 3 m/min at a coating wight of 70 mg/dm².

The paper carrier was affixed to a packet of peas in a deep freeze. After one hour to allow the carrier to become acclimatised to the temperature of the deep freeze which was −50° C. the carrier was abraded with a stylus to break the capsules. The temperature of the deep freeze was then allowed to rise. When it reached −1° C. which is the melting point of the 1-bromonaphthalene a distinctive bluish colour was observed on the carrier which indicated that the packet of peas had exceeded −1° C.

EXAMPLES 2 TO 7

Similarly, two layer assemblies were prepared with alterations to the ingredients of the composition.

| Example | Acidic Reactant | Colour Former | Solvent | Colour of Dye Formed | at °C. |
|---|---|---|---|---|---|
| 2 | Silica Gel | Benzoyl Leuco Methylene Blue | 1-bromo-Naphthalene | Blue | −1 |
| 3 | Silica Gel | Crystal Violet Lactone | Diethyl Phthalate | Blue | −3 |
| 4 | Silical Gel | Benzoyl Leuco Methylene Blue | Diethyl Phthalate | Blue | −3 |
| 5 | Bisphenol A | Crystal Violet Lactone | 1-bromo-Naphthalene | Blue | −1 |
| 6 | Silical Gel | Mixture of 0.5 Crystal Violet Lactone and 0.5 g Benzoyl Leuco Methylene Blue | Benzyl Laurate | Blue | −1 |
| 7 | Silica Gel | Crystal Violet Lactone | Benzyl Laurate | Blue | +8 |

In all cases a distinctive blue colour appeared when the temperature of the deep freeze rose to the indicated temperature.

In the case of Example 5, 5 g of bisphenol-A was used instead of 2 g of silica gel. A fine dispersion of bisphenol-A was obtained by adding an acetone solution of the bisphenol-A to the gelatin solution at 40° to 50° C.

EXAMPLE 8

(a) A silica gel layer was prepared on white paper as in Example 1.

(b) Microcapsules were prepared as hereinbefore set forth but the solution which was encapsulated comprised a solution of 15 g of crystal violet lactone in 30 g of 1-bromonaphthalene.

These capsules were dispersed in a 10% aqueous gelatin solution (25 g) containing the anionic surfactant used in Example 1 (0.4 g) and the whole made up to 50 g with water. This mixture was coated on layer (a) at 10 ft/min at a coating weight of 70 mg/dm².

The paper carrier was affixed to a packet of frozen fish fingers in a deep freeze. After one hour to allow the carrier to become acclimatised to the temperature of the deep freeze which was −5° C. the carrier was abraded to break the capsules. The temperature of the deep freeze was maintained at −5° C. for several weeks and no change in colour of the carrier was observed. However the temperature of the deep freeze was then allowed to rise. When it reached −1° C. a distinctive blue colour was observed.

EXAMPLE 9

On a white paper carrier there were coated in clearly distinct areas the colourable composition of Example 3 (Composition 1) and the colourable composition of Example 5 (Composition 2).

An assembly of this type can be used to determine if the stored product has exceeded −3° C., but has not exceeded −1° C. In the case of some stored products if they have exceeded by a small amount a predetermined temperature they can continue to be stored but for a limited period, but if they have also exceeded a higher predetermined temperature they must be removed from storage and disposed of.

Thus the assembly of this Example is of use for products which are stored in general below −3° C. but if the temperature exceeds −1° C. they must be disposed of.

Thus the assembly of this example was affixed to such a product and after acclimatisation of one hour at the storage temperature of −5° C. the capsules of solvent in the colourable compositions were broken. The temperature of the deep freeze was then allowed to gradually rise in temperature. When the temperature had reached −3° C. the colour of composition 1 changed to a blue, but the colour of composition 2 was unchanged. The colour of composition 2 was unchanged until the temperature of the deep freeze was allowed to rise further.

When it reached $-1°$ C. the colour of composition 2 was also changed to a blue colour thus indicating that the higher predetermined temperature had also been exceeded.

It is to be understood that the colour former component of the composition may contain two or more colour formers to provide a more suitable colour change or to provide a colouring system which reacts rapidly but has greater light stability.

What is claimed is:

1. A method of monitoring if a stored product has exceeded a predetermined temperature which comprises using as a colourable composition a colour former and an acidic reactant, there being present a non-aqueous solvent in which colour formation can take place when said solvent is in a molten state but not when said solvent is in a solid state at a temperature below said predetermined temperature, said solvent being adapted to melt at said predetermined temperature, said method further comprising encapsulating the solvent and at least one other component of the colourable composition, said at least one other component and the solvent when encapsulated together are not capable of producing a colour, applying the capsules and the remaining component of said colourable composition to a carrier with a binder, acclimatizing the carrier and the encapsulated solvent to a storage temperature of the product, said storage temperature being below said predetermined temperature, then, when said carrier is in close proximity with the stored product, breaking the capsules by hand or by use of a rough surface, a stylus or a (semi) automatic punching device and observing when a substantially irreversible colour change occurs which indicates that the stored product has exceeded said predetermined temperature.

2. A method according to claim 1, wherein the colour former and the solvent are present in the capsules and the reactant is applied separately to the carrier.

3. A method according to claim 1, wherein the reactant and the solvent are in the capsules and the colour former is applied separately to the carrier.

4. A method according to claim 1, wherein the solvent is in the capsules and the colour former and reactant are applied to the carrier.

5. A method according to claim 4, wherein the colour former and reactant are present in admixture on the carrier.

6. A method according to claim 4, wherein the colour former and the reactant are in separate layers on the carrier.

7. A method according to claim 1, wherein the solvent is also the reactant and is present in the capsules and the colour former is applied separately to the carrier.

8. A method according to claim 1, wherein the solvent is also the colour former and is present in the capsules and the reactant is applied separately to the carrier.

9. A method according to claim 1, wherein the binder is gelatin, nitrocellulose, cellulose acetate or polyvinyl pyrrolidinone.

10. A method according to claim 1, wherein the colour former is a phthalide, fluoran, leucoauramine, spirodipyrane, chromenoindole, chromenopyrazole, phenoxazin, phenothiazin, quinazoline, carbazolylmethane, triarylmethane, rhodamine lactam or azomethine compound.

11. A method according to claim 10, wherein the colour former is a crystal violet lactone.

12. A method according to claim 11, wherein the colour former is a benzoyl leuco methylene blue.

13. A method according to claim 1, wherein the acid reactant is a phenolic compound, a dicarboxylic acid, a chloral reaction product, a Lewis acid, activated acidic clay or silica gel.

14. A method according to claim 1, wherein the non-aqueous solvent is diethyl succinate, diethyl phthalate, 1-bromonaphthalene, dimethyl phthalate, dimethyl adipate, benzyl laurate, decyldecanoate, acetonaphthalene, butyl stearate, ethyl myristate, dimethyl succinate, benzyl myristate, benzyl palmitate, lauric acid, myristic acid or palmitic acid.

15. A method according to claim 1, wherein the colourable composition also comprises zinc stearate and/or starch granules.

16. A method of monitoring if a stored product has exceeded a predetermined lower temperature but is still below a predetermined higher temperature which comprises forming on a carrier in clearly separate areas two colourable compositions, wherein a first of said two colourable compositions includes a colour former, an acidic reactant and a first non-aqueous solvent in which colour formation can take place when said first solvent is in a molten state at a temperature at or above said predetermined lower temperature but not when said first solvent is in a solid state at a temperature below said predetermined lower temperature, said first solvent and at least one other component of said first colourable composition being encapsulated, the capsules and the remaining component of said first colourable composition being applied to a first area of said carrier with a binder, and wherein a second of said two colourable compositions includes a colour former, an acidic reactant and a second non-aqueous solvent in which colour formation can take place when said second solvent is in a molten state at a temperature at or above said predetermined higher temperature but not when said second solvent is in a solid state at a temperature below said predetermined higher temperature, said second solvent and at least one other component of said second colourable composition being encapsulated, the capsules and the remaining component of said second colourable composition being applied to a second area of said carrier with a binder, said first composition changes colour at said predetermined lower temperature and said second composition changes colour at said predetermined higher temperature, acclimatizing the carrier and encapsulated solvents to a storage temperature of the product, said storage temperature being below said predetermined lower temperature, then when said carrier is in close proximity with the product breaking the capsules of encapsulated solvent in each of said separate areas and observing when a colour change occurs in the first colourable composition which changes colour at the predetermined lower temperature to indicate that the stored product has exceeded the said predetermined lower temperature and noting if a change in colour of the second-colourable composition has occurred which, if it has, would indicate that the stored product has exceeded also the higher predetermined temperature.

17. A method according to claim 1, wherein the composition is coated onto a carrier, in this order, a gelatin layer containing an acidic reactant and a gelatin layer containing a colour former and an encapsulated non-aqueous solvent.

18. A method according to claim 16, wherein said first composition is coated onto said first area of a carrier, in this order, a gelatin layer containing an acidic reactant and a gelatin layer containing a colour former and an encapsulated non-aqueous solvent, and said second composition is coated onto said second area of said carrier, in this order, a gelatin layer containing an acidic reactant and a gelatin layer containing a colour former and an encapsulated non-aqueous solvent.

* * * * *